A. A. LAMOUREUX.
DEVICE FOR EXTRACTING SINEWS FROM FLESH.
APPLICATION FILED MAR. 1, 1912.
1,041,308.
Patented Oct. 15, 1912.
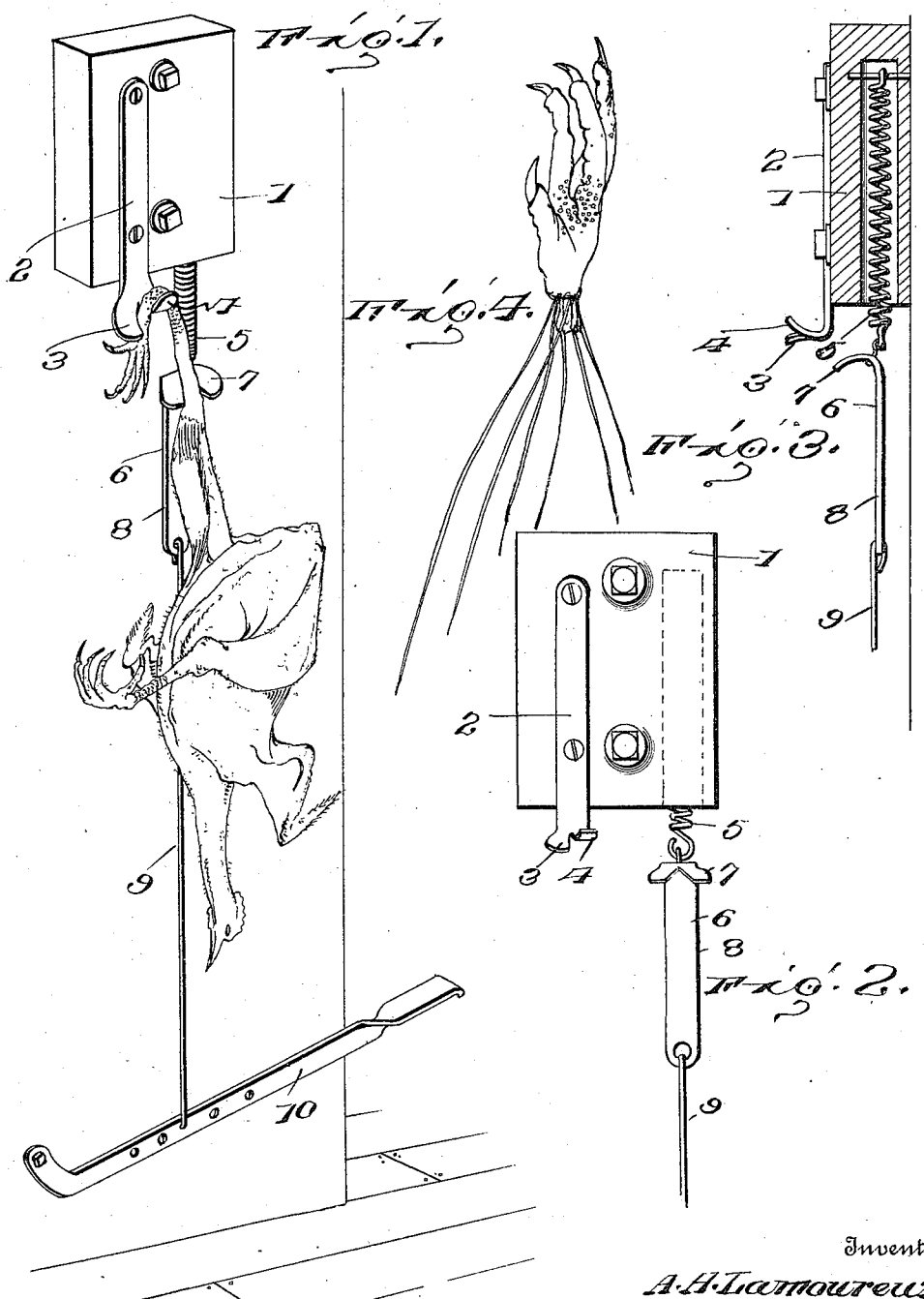
Inventor
A. A. Lamoureux
Witnesses
By
Attorneys.

UNITED STATES PATENT OFFICE.

ARTHUR ARSENE LAMOUREUX, OF MANCHESTER, NEW HAMPSHIRE.

DEVICE FOR EXTRACTING SINEWS FROM FLESH.

1,041,308.   Specification of Letters Patent.   Patented Oct. 15, 1912.

Application filed March 1, 1912. Serial No. 680,999.

*To all whom it may concern:*

Be it known that I, ARTHUR A. LAMOUREUX, citizen of the United States, residing at Manchester, in the county of Hillsboro and State of New Hampshire, have invented certain new and useful Improvements in Devices for Extracting Sinews from Flesh, of which the following is a specification.

This invention relates to device for drawing sinews from the meat of fowls or animals without cutting the meat or removing the same from the bone.

The device consists of a claw adapted to be supported upon a fixed object and a claw movably mounted with relation to the first mentioned claw. A treadle means is provided for moving the last mentioned claw away from the first mentioned claw and a return spring is connected with the second mentioned claw. A hand grip is provided upon the second mentioned claw. The bone of that part of the fowl or animal to be removed is broken and that part together with the sinews is engaged with the first mentioned claw and the meat from which the sinews are to be removed is engaged with the second mentioned claw, then the second mentioned claw is moved away from the first mentioned claw and the bone is fractured and the sinews are pulled out, as above indicated.

For a full understanding of the invention reference is to be had to the following description and accompanying drawings, in which:—

Figure 1 is a perspective view of the device, showing the leg of a fowl applied to the same; Fig. 2 is a front elevation of the device; Fig. 3 is a transverse sectional view of same; Fig. 4 is a perspective view of a foot of a fowl after it has been removed from the leg, showing the sinews attached to the foot.

Corresponding and like parts are referred to in the following description and indicated in all the views of the accompanying drawing by the same reference characters.

The device consists of a casing or block 1 which is adapted to be secured to a stationary object. Any suitable means may be provided for securing the said casing in position. A claw member 2 is fixed to the side of the casing 1 and projects below the lower end thereof. At its lower end the member 2 is provided with spaced fingers 3 and 4. The finger 3 stands out approximately horizontally, while the finger 4 is upwardly curved along its length. The upper end of a coiled spring 5 is secured in the casing 1 and to the lower end thereof is secured a claw member 6. This member 6 is provided at its upper end with outwardly disposed spaced fingers 7. The member 6 is provided with a portion 8 which serves as a hand grip. A rod 9 is connected at its upper end with the lower end of the claw member 6 and at its lower end is adjustably connected with a lever 10 which is fulcrumed to a fixed object.

In operation, the member of a fowl or animal is engaged with the claw member 2 between the fingers 3 and 4 thereof and one of the bones of the fowl or animal is permitted to lie transversely across the finger 4. The bone is then bent down over the finger 4 so that it is broken in close proximity to the edge of the said finger. After the bone is broken the member of the fowl or animal is inserted between the fingers 7 and the claw member 6. The operator then grasps the grip portion 8 of the member 6 and at the same time holds the part of the fowl or animal against the member 6. When this is done the operator depresses the free end of the lever 10 by placing his foot thereon and at the initial downward movement of the member 6 the bone of the fowl or animal that lies transversely across the finger 4 is broken or fractured. Then as the member 6 continues in its downward movement the flesh is drawn away from the confined member and inasmuch as the sinews remain connected with the bones of the member of the fowl or animal that is confined between the claws 3 and 4 the said sinews are pulled out of the flesh which follows the member 6. When this is done the flesh is removed from the member 6 and pressure is removed from the free end of the lever 10. Then the tension of the spring 5 comes into play and the member 6 is moved back to its normal position with relation to the member 2.

By providing means for adjustably connecting the rod 9 with the lever 10 the said rod may be connected relatively near or remote from the fulcrum point of the lever so that more or less leverage may be gained according to the size and strength of the limb or part of the fowl or animal from which the sinews are removed. Therefore it will be seen that in addition to providing means for removing the sinews from the meat or flesh, the sinews are not detached from the bones of the member of the fowl or animal and consequently the fracture of the bone and separation of the fractured portion from the body portion thereof removes the sinews from the flesh or meat without necessitating the use of a knife upon the latter.

Having thus described the invention, what is claimed as new is:

A device for removing sinews from meat on the bone comprising a fixed support, a claw member fixed upon the support and having spaced arms extending laterally therefrom, one of said arms having its free end bent downwardly and the other of said arms having its free end bent upwardly, a second claw member yieldably supported adjacent the first, and means for moving said second claw member away from the first.

In testimony whereof I affix my signature in presence of two witnesses.

ARTHUR ARSENE LAMOUREUX. [L. S.]

Witnesses:
HERMAN C. STACHE,
H. E. TOZIER.

---

Copies of this patent may be obtained for five cents each, by addressing the "Commissioner of Patents, Washington, D. C."